(12) United States Patent
Minamisawa et al.

(10) Patent No.: US 10,185,156 B2
(45) Date of Patent: Jan. 22, 2019

(54) OPTICAL UNIT WITH PLATE-SHAPED SPRING HAVING MEANDERING OR CURVED PARTS

(71) Applicant: NIDEC SANKYO CORPORATION, Suwa-gun, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 46 days.

(21) Appl. No.: 15/434,554

(22) Filed: Feb. 16, 2017

(65) Prior Publication Data
US 2017/0235155 A1    Aug. 17, 2017

Related U.S. Application Data

(60) Provisional application No. 62/296,314, filed on Feb. 17, 2016.

(30) Foreign Application Priority Data

Feb. 26, 2016 (JP) .................................. 2016-035627

(51) Int. Cl.
*G02B 27/64* (2006.01)
*G02B 7/02* (2006.01)

(52) U.S. Cl.
CPC ........... *G02B 27/646* (2013.01); *G02B 7/023* (2013.01)

(58) Field of Classification Search
CPC .. G02B 27/64; G02B 27/646; H04N 5/23248; H04N 5/23264; H04N 5/2328; H04N 5/23287

USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | |
|---|---|---|---|
| 9,459,464 B2* | 10/2016 | Minamisawa | ........... G02B 7/08 |
| 9,527,161 B2* | 12/2016 | Watanabe | ............. B23K 26/20 |
| 9,891,444 B2* | 2/2018 | Minamisawa | ....... G02B 27/646 |
| 2017/0003517 A1* | 1/2017 | Sue | ........................... G02B 7/08 |
| 2017/0017093 A1* | 1/2017 | Minamisawa | ....... G02B 27/646 |
| 2017/0176766 A1* | 6/2017 | Sue | ...................... G02B 27/646 |
| 2017/0176767 A1* | 6/2017 | Yanagisawa | ......... G02B 27/646 |

FOREIGN PATENT DOCUMENTS

JP        2015064501 A     4/2015

* cited by examiner

*Primary Examiner* — Arnel C Lavarias
(74) *Attorney, Agent, or Firm* — Cantor Colburn LLP

(57) ABSTRACT

An optical unit with a shake correction function may include a movable body which may include an optical module and a holder for holding the optical module, and a gimbal mechanism which swingably supports the movable body with respect to a fixed body. The gimbal mechanism may include a movable frame which is a gimbal spring. The movable frame may include a supporting point part and a connecting part including a meandering part. The meandering part has a cross-sectional shape in which on the assumption that a direction perpendicular to first and second axial lines is a first direction and a direction perpendicular to the first direction and a meandering path of the meandering part is a second direction, a thickness in the second direction is larger than a thickness in the first direction of each plate-shaped spring which structures the movable frame.

14 Claims, 6 Drawing Sheets

OPTICAL UNIT WITH PLATE-SHAPED SPRING HAVING MEANDERING OR CURVED PARTS

CROSS REFERENCE TO RELATED APPLICATION

The present invention claims priority under 35 U.S.C § 119 to Japanese Application No. 2016-035627 filed Feb. 26, 2016, the entire content of which is incorporated herein by reference. The present invention also claims priority under 35 U.S.C § 119(e) to U.S. provisional application 62/296,314 filed Feb. 17, 2016 the entire content of which is also incorporated herein by reference.

FIELD OF THE INVENTION

At least an embodiment of the present invention may relate to an optical unit with a shake correction function including a gimbal mechanism to swingably support a movable body.

BACKGROUND

Various optical units have been used, each of which has an optical module for photographing mounted thereon. In order to restrain disturbance of a photographed image due to a shake of a user's hand or a vibration, such an optical unit includes a shake correction drive mechanism structured to swing an optical module, thereby correcting a shake. Such an optical unit also includes a gimbal mechanism disposed between a fixed body and a movable body on which the optical module is mounted. The gimbal mechanism serves as a support mechanism for swingably supporting the movable body with respect to the fixed body. Japanese Patent Laid-Open No. 2015-064501 discloses an optical unit with a shake correction function including a gimbal mechanism of this type.

The gimbal mechanism disclosed in Japanese Patent Laid-Open No. 2015-064501 includes a gimbal spring (a movable frame) in a rectangular frame shape, and swing support parts each structured to support the gimbal spring. Of two sets of the swing support parts provided diagonally on the gimbal spring, one set is provided on a fixed body whereas the other set is provided on a movable body. The gimbal spring includes supporting point parts which are supported by the swing support parts, and connecting parts each of which connects two supporting point parts to each other and includes a meandering part.

By virtue of the meandering parts, the gimbal spring (the movable frame) is allowed to have both of a spring characteristic in a plane direction and a spring characteristic in a direction perpendicular to the plane direction. Depending on applications of an optical unit with a shake correction function, however, an excessive spring characteristic to be effected by a meandering part is sometimes unwanted. For example, a shift amount of a movable body to which an external impact has been applied is sometimes required to be reduced. However, gimbal springs shaped to meet such a requirement have not been proposed yet.

SUMMARY

In view of the circumstances described above, at least an embodiment of the present invention may advantageously provide an optical unit with a shake correction function structured such that a support mechanism including a movable frame supports a movable body, thereby reducing a shift amount of the movable body due to an external impact.

In order to attain the objective, at least an embodiment of the present invention provides an optical unit with a shake correction function including a movable body, a fixed body, a support mechanism structured to swingably support the movable body around a first axial line and a second axial line intersecting each other, and a shake correction drive mechanism structured to swing the movable body. The support mechanism includes a movable frame and a plurality of swing support parts structured to support the movable frame. Some of the swing support parts are provided on the fixed body and the remaining swing support parts are provided on the movable body. The movable frame is structured of a single plate-shaped spring or a stacked body of a plurality of plate-shaped springs stacked on top of each other in a first direction perpendicular to the first axial line and the second axial line. Each plate-shaped spring includes supporting point parts which are in contact with the swing support parts and connecting parts each of which connects two supporting point parts to each other and includes a meandering part or a curved part located on an inner peripheral side relative to the supporting point part. At each of the meandering parts or curved parts, a thickness in a second direction perpendicular to the first direction and a meandering path of the meandering part or a curved path of the curved part is larger than a thickness in the first direction of each plate-shaped spring.

According to at least an embodiment of the present invention, the support mechanism structured to swingably support the movable body includes the movable frame, the movable frame is structured of the single plate-shaped spring or the stacked body of the plate-shaped springs which are stacked on top of each other, and each of the plate-shaped springs includes the supporting point parts to be supported by the swing support parts, and the meandering part or curved part located on the inner peripheral side relative to the supporting point parts. Therefore, the movable frame has a spring characteristic in a direction of a plane containing the plate-shaped spring(s), thereby preventing a device from being damaged due to an external impact. According to at least an embodiment of the present invention, on the other hand, each of the meandering parts or curved parts is shaped to enhance its stiffness. Specifically, on the assumption that the direction perpendicular to the first axial line and the second axial line is defined as the first direction and the direction perpendicular to the first direction and the meandering path of each meandering part or the curved path of each curved part is defined as the second direction, each of the meandering parts or curved parts has a cross-sectional shape in which the thickness in the second direction (i.e., a size of each meandering part or curved part when viewed in the first direction) is larger than the thickness in the first direction (i.e., a thickness in a direction perpendicular to the plane containing the plate-shaped spring(s)). With this cross-sectional shape, it is possible to appropriately enhance the stiffness of each meandering part or curved part while allowing each meandering part or curved part to have the spring characteristic in the plane direction. Accordingly, it is possible to reduce a shift amount of the movable body due to an external impact.

In at least an embodiment of the present invention, it is desirable that each of the connecting parts includes the meandering part and straight parts which connect the meandering part to the supporting point parts. It is also desirable that each of the meandering parts includes a first curved part protruded to an outer peripheral side, a second curved part protruded to an inner peripheral side on one side in a circumferential direction of the first curved part, and a third curved part protruded to the inner peripheral side on the other side in the circumferential direction of the first curved part. It is also desirable that the second curved part and the third curved part are respectively connected to the straight parts in a curved shape. This structure can effect more excellent spring characteristic than the spring characteristic to be effected by the curved shape. Further, it is possible to suppress excessive enhancement in spring characteristic owing to the small number of meandering portions. Accordingly, it is possible to prevent the device from being damaged due to an external impact and to reduce a shift amount of the movable body due to an external impact or the like.

In at least an embodiment of the present invention, it is desirable that a thickness in the second direction of each meandering part is larger than a thickness in the second direction of each straight part. According to this structure, it is possible to appropriately enhance the stiffness of each meandering part and to reduce a space for disposing each straight part. Accordingly, it is possible to appropriately enhance the stiffness of each meandering part and to miniaturize the entire device.

In at least an embodiment of the present invention, it may be structured that the movable frame is structured of the stacked body in which some or all of the plate-shaped springs are joined together at the supporting point parts. According to this structure, it is possible to achieve a required cross-sectional shape by stacking the plate-shaped springs on top of each other even when a dimension in a thickness direction of each plate-shaped spring cannot be set freely depending on, for example, a method for manufacturing the plate-shaped springs. Further, it is possible to enhance the stiffness of each plate-shaped spring by joining the plate-shaped springs together at the supporting point parts where load is to be applied.

In at least an embodiment of the present invention, it is desirable that at each of the plate-shaped springs, the thickness in the second direction of each meandering part is not less than twice as large as the thickness in the first direction of each meandering part. According to this structure, it is possible to appropriately enhance the stiffness of each meandering part or curved part even when the movable frame is structured of one plate-shaped spring. It is possible to further enhance the stiffness when the movable frame is structured of two plate-shaped springs.

For example, when the plurality of plate-shaped springs includes a first plate-shaped spring, a second plate-shaped spring, and a third plate-shaped spring which are stacked on top of each other in the first direction, it may be structured that the first plate-shaped spring and the second plate-shaped spring are joined together at the supporting point parts, and the third plate-shaped spring and the second plate-shaped spring are joined together at both sides in the circumferential direction of each supporting point part. As described above, when the plate-shaped springs are joined together at the supporting point parts and their vicinities, the plate-shaped springs are joined together at locations where load is to be applied and their vicinities. The stiffness of each plate-shaped spring can thus be enhanced. Further, when one plate-shaped spring is additionally joined to a movable frame structured of two plate-shaped springs which are stacked on top of each other and joined together at supporting point parts, the stiffness of the movable frame can be enhanced as compared with a movable frame structured of two plate-shaped springs.

In this case, it is desirable that the third plate-shaped spring includes a thin-walled part to be joined to the second plate-shaped spring. According to this structure, in joining the plate-shaped springs together by laser welding, it is possible to securely join the plate-shaped springs together without high-power welding.

In at least an embodiment of the present invention, it is desirable that the third plate-shaped spring includes outer cut-out parts formed by cutting outer peripheral edges of the connecting parts toward an inner side relative to the first plate-shaped spring and the second plate-shaped spring. Further, it is desirable that the third plate-shaped spring includes inner cut-out parts formed by cutting outer peripheral edges of the connecting parts toward an outer side relative to the first plate-shaped spring and the second plate-shaped spring. Even when the movable frame is inclined at the swinging of the movable body, the cut-out parts formed as described above decrease a possibility that the third plate-shaped spring, which is disposed at a location far from the contact portions of the movable frame with the swing support parts, comes into contact with its neighboring components.

In at least an embodiment of the present invention, it is desirable that the movable body includes an optical module and a plurality of wall parts located on an outer peripheral side of the optical module. It is also desirable that the wall parts are provided to be separated from each other in the circumferential direction, and a coil of the shake correction drive mechanism is fixed to each wall part. It is also desirable that the meandering parts or curved parts of the movable frame are located on inner peripheral sides of the wall parts, and each of the supporting point parts of the movable frame is disposed between adjacent wall parts in the circumferential direction. As described above, when the meandering parts or curved parts are located on the inner peripheral sides of the coil fixing wall parts and each of the supporting point parts is disposed between adjacent wall parts in the circumferential direction, each meandering part or curved part of the movable frame is recessed to the inner peripheral side. Accordingly, it is possible to dispose the wall parts and the coils on the inner peripheral side. Further, there is no necessity to secure a space for disposing a wall part on the outer peripheral side of each supporting point part. Accordingly, it is possible to miniaturize the entire device.

According to at least an embodiment of the present invention, the support mechanism structured to swingably support the movable body includes the movable frame, the movable frame is structured of the single plate-shaped spring or the stacked body of the plate-shaped springs which are stacked on top of each other in the first direction perpendicular to the first axial line and the second axial line, and each of the plate-shaped springs includes the meandering part or curved part between two supporting point parts. At each of the meandering parts or curved parts, on the assumption that the direction perpendicular to the first axial line and the second axial line is defined as the first direction and the direction perpendicular to the first direction and the meandering path of the meandering part or the curved path of the curved part is defined as the second direction, the thickness in the second direction (i.e., the size of each meandering part or curved part when viewed in the first direction) is larger than the thickness in the first direction of each plate-shaped spring (i.e., the thickness in the direction perpendicular to the plane containing the plate-shaped spring(s)). With such a cross-sectional shape, it is possible to appropriately enhance the stiffness of each meandering part or curved part while allowing each meandering part or curved part to have the spring characteristic in the plane direction. Accordingly, it is possible to prevent the device from being damaged due to an external impact and to suppress excessive increase in shift amount of the movable body due to an external impact.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Entire Structure)

An optical unit 1 with a shake correction function to which an embodiment of the present invention is applied will be described below with reference to the accompanying drawings. In the following description, three directions perpendicular to each other are set to be an "X"-axis direction, a "Y"-axis direction, and a "Z"-axis direction. Further, "+X" is indicated on one side in the "X"-axis direction, "—X" is indicated on the other side, "+Y" is indicated on one side in the "Y"-axis direction, "—Y" is indicated on the other side, "+Z" is indicated on one side in the "Z"-axis direction, and "–Z" is indicated on the other side. The "Z"-axis direction extends along an optical axis L of an optical module 2 mounted on a movable body 10 of an optical unit 1 with a shake correction function in a state in which the movable body 10 is not swung. Further, the side "–Z" in the "Z"-axis direction corresponds to an image side in an optical axis "L" direction and the side "+Z" in the "Z"-axis direction corresponds to an object side (an object to be photographed side) in the optical axis "L" direction.

Figure 1A:
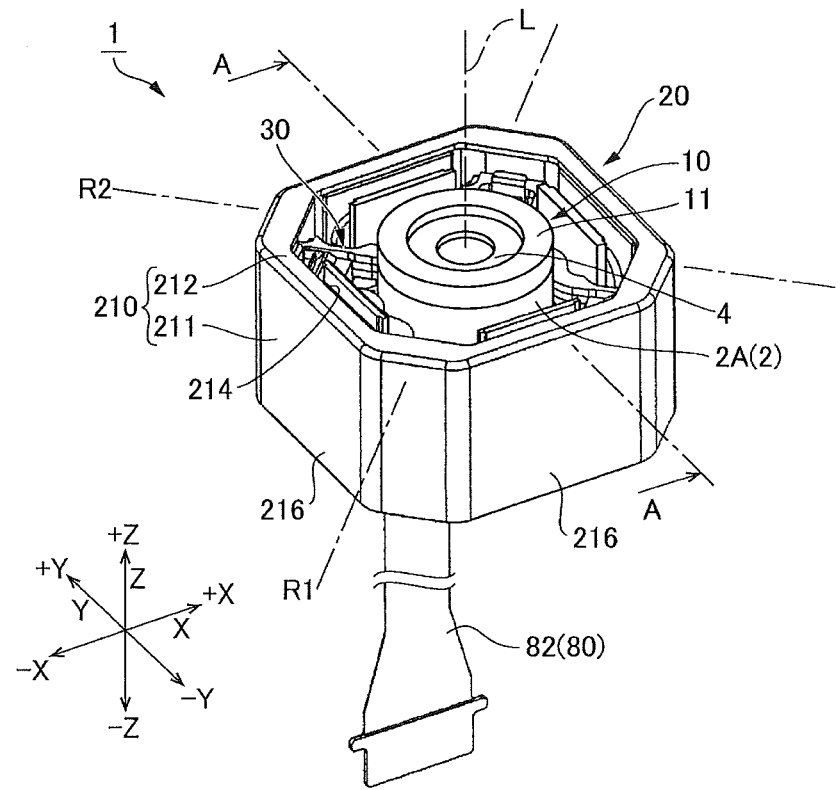
FIG. 1A is a perspective view showing an optical unit with a shake correction function to which at least an embodiment of the present invention is applied and which is viewed from an object side.
Figure 1B:
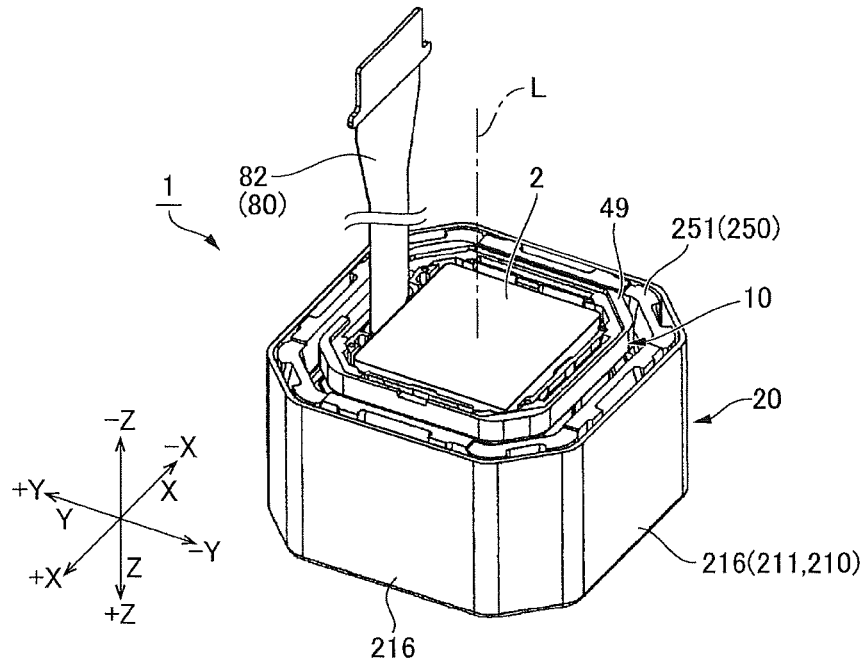
FIG. 1B is a perspective view showing the optical unit with a shake correction function which is viewed from an image side.
Figure 2:
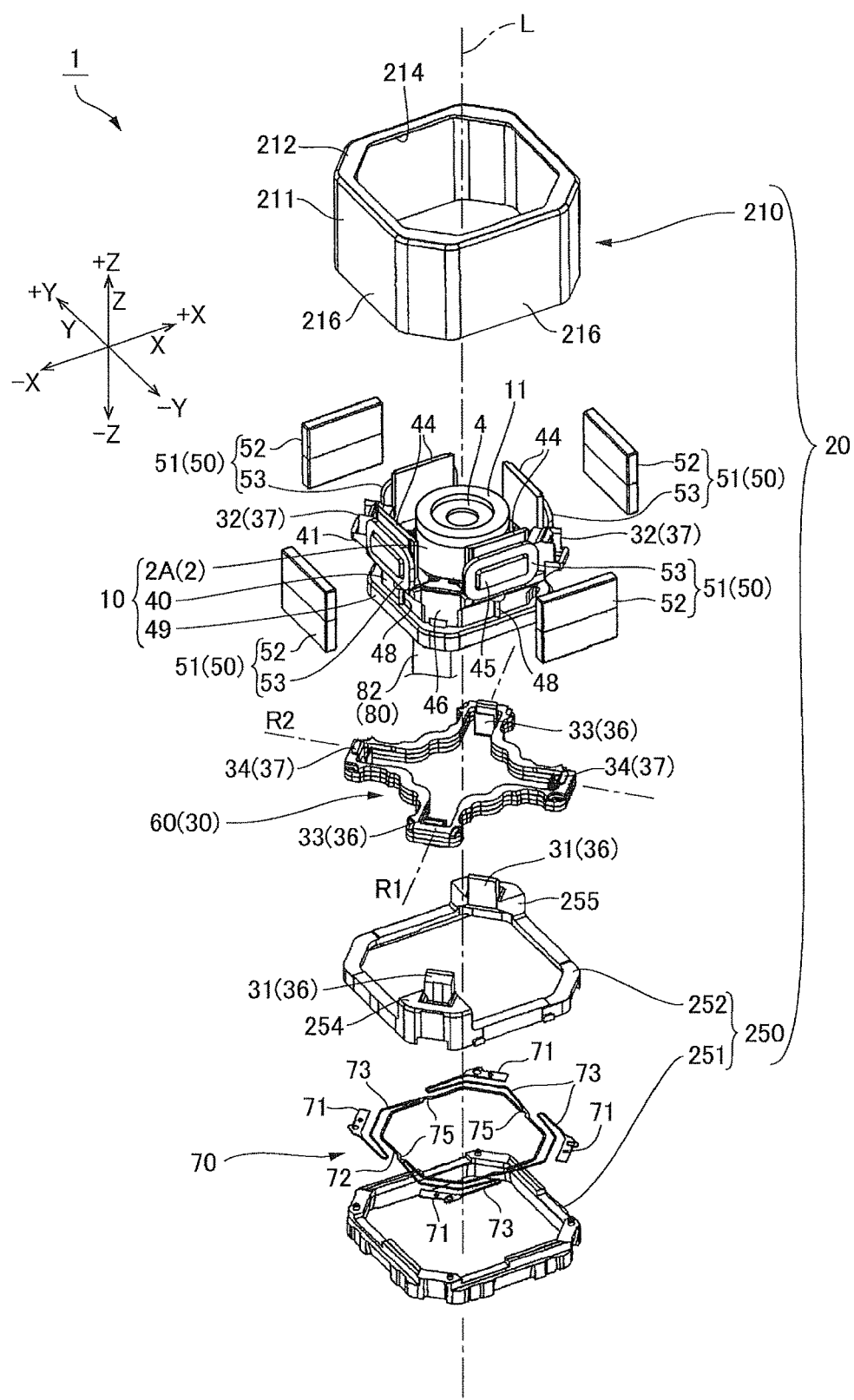
FIG. 2 is an exploded perspective view showing the optical unit with a shake correction function shown in FIGS. 1A and 1B which is viewed from an object side.
Figure 3:
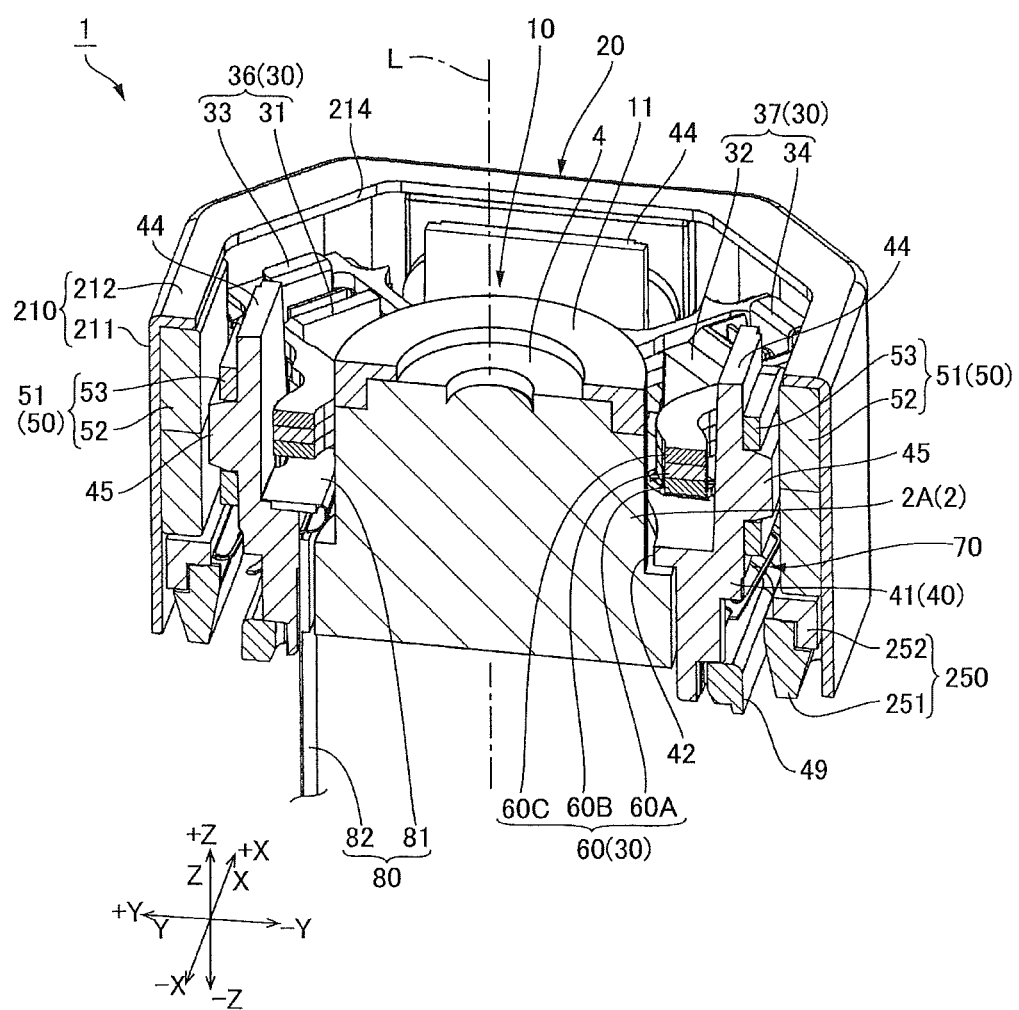
FIG. 3 is a perspective cross-sectional view showing the optical unit with a shake correction function shown in FIGS. 1A and 1B.

FIG. 1A is a perspective view showing an optical unit 1 with a shake correction function which is viewed from an object side. FIG. 1B is a perspective view showing the optical unit 1 with a shake correction function which is viewed from an image side. FIG. 2 is an exploded perspective view showing the optical unit 1 with a shake correction function which is viewed from the object side. FIG. 3 is a perspective cross-sectional view showing the optical unit 1 with a shake correction function which is taken along line A-A in FIG. 1A. The optical unit 1 with a shake correction function is used in, for example, a cell phone with a camera, an optical device such as a drive recorder, and an optical device such as an action camera or a wearable camera mounted on a helmet, a bicycle, a radio-controlled helicopter, or the like. Such an optical device corrects a shake occurring at the time of photographing, by driving the optical unit 1 with a shake correction function, in order to avoid occurrence of disturbance of a photographed image.

The optical unit 1 with a shake correction function includes a movable body 10, a fixed body 20, a gimbal mechanism 30 as a support mechanism which swingably supports the movable body 10 with respect to the fixed body 20, a shake correction drive mechanism 50 structured to generate a magnetic-drive force for relatively displacing the movable body 10 with respect to the fixed body 20, a spring member 70 structured to connect the movable body 10 to the fixed body 20, and a flexible circuit board 80. The optical unit 1 with a shake correction function supplies power to the shake correction drive mechanism 50 via the flexible circuit board 80. A host controller provided on a main body side of an optical device, on which the optical unit 1 with a shake correction function is mounted, performs shake correction by driving the shake correction drive mechanism 50 to swing the movable body 10, based on an output from a gyroscope (a shake detection sensor) structured to detect a shake when the shake is occurred in the optical device.

The movable body 10 is swingably supported by the gimbal mechanism 30 around a first axial line "R1" intersecting the optical axis "L" and a second axial line "R2" intersecting the optical axis "L" and the first axial line "R1". The first axial line "R1" and the second axial line "R2" extend in diagonal directions of the fixed body 20 and are perpendicular to the optical axis "L". Further, the first axial line "R1" and the second axial line "R2" are perpendicular to each other.

(Fixed Body)

The fixed body 20 includes a first case 210 having a substantially square contour when viewed in the "Z"-axis direction, and a second case 250 to be mounted to the first case 210 from the side "–Z" in the "Z"-axis direction. The first case 210 is fixed to the second case 250 by welding or the like. The first case 210 includes a body part 211 in a rectangular tube shape surrounding the movable body 10, and an end plate part 212 in a rectangular frame shape which is protruded to an inner side from an end part on the side "+Z" in the "Z"-axis direction of the body part 211. A window 214 is formed at a center of the end plate part 212. The body part 211 includes side plate parts 216 respectively located on the side "+X" in the "X"-axis direction, the side "–X" in the "X"-axis direction, the side "+Y" in the "Y"-axis direction, and the side "–Y" in the "Y"-axis direction.

The second case 250 is structured of two members, that is, a first member 251 in a rectangular frame shape and a second member 252 in a rectangular frame shape which is attached to the "+Z" side in the "Z"-axis direction of the first member 251. The spring member 70 structured to connect the movable body 10 to the fixed body 20 is attached to an inner peripheral side of the second case 250. The second member 252 includes sidewall parts 254, 255 provided diagonally on the first axial line "R1" so as to extend toward the side "+Z" in the "Z"-axis direction. The sidewall parts 254, 255 are provided with first contact spring holding parts 31, 31 which structure first swing support parts 36, 36 of the gimbal mechanism 30.

(Movable Body)

The movable body 10 includes an optical module 2, a holder 40 structured to hold the optical module 2, a weight 11 fixed to an end part on the side "+Z" in the "Z"-axis direction of the optical module 2, and a stopper 49 in a frame shape which is attached to an end part on the side "−Z" in the "Z"-axis direction of the holder 40. The stopper 49 comes into contact with an inner peripheral face of the second case 250 of the fixed body 20 when the movable body 10 is swung, to restrict a swingable range of the movable body 10. As shown in FIG. 3, the optical module 2 includes an upper module 2A in a columnar shape which is structured to hold a lens unit as an optical element. A lens holder 4 in a columnar shape protrudes from an end part on the side "+Z" in the "Z"-axis direction of the upper module 2A. The weight 11 is made of nonmagnetic metal and is attached to surround an outer peripheral side and the side "+Z" in the "Z"-axis direction of the lens holder 4.

The holder 40 includes a frame part 41 in a substantially square plan shape when viewed in the "Z"-axis direction. The frame part 41 has a circular holding hole 42 (see FIG. 3) formed at a center thereof, and the optical module 2 is disposed in the holding hole 42. The frame part 41 includes four wall parts 44 provided to surround an outer peripheral side of the holding hole 42 and to extend toward the side "+Z" in the "Z"-axis direction. The wall parts 44 also extend linearly in the "X"-axis direction or the "Y"-axis direction from centers of lateral end edges of the frame part 41. Each of the four wall parts 44 includes a coil holding part 45 formed on an outer side face which faces an opposite side to the holding hole 42. The coil holding parts 45 are rectangular protruded parts to which coils 53 of magnetic-drive mechanisms 51 are attached. As shown in FIG. 3, the coil holding parts 45 are protruded from centers of the coils 53 toward magnets 52 so as to face the magnets 52. When the movable body 10 is displaced due to a vibration or the like in the "X"-axis direction or the "Y"-axis direction, the coil holding parts 45 come into contact with the magnets 52 to restrict a movable range of the movable body 10.

The flexible circuit board 80 is attached to the frame part 41 to supply power to the coils 53. The flexible circuit board 80 includes a rectangular frame portion 81 extending along inner peripheral sides of the four wall parts 44, and a leading-around part 82 in a belt shape which is led around from an inner peripheral edge of the rectangular frame portion 81 to the side "−Z" in the "Z"-axis direction through the holding hole 42.

The frame part 41 has cut-out parts 46 (see FIG. 2) provided diagonally on the first axial line "R1" and cut along a face perpendicular to the first axial line "R1". When the movable body 10 is mounted to the fixed body 20, the sidewall parts 254, 255 provided at diagonal positions on the first axial line "R1" of the second case 250 are disposed on the cut-out parts 46, 46. Accordingly, the first contact spring holding parts 31, 31 on the sidewall parts 254, 255 are disposed at diagonal positions on the first axial line "R1" of the frame part 41. The frame part 41 also has second contact spring holding parts 32 provided diagonally on the second axial line "R2", and the second contact spring holding parts 32 structure second swing support parts 37 of the gimbal mechanism 30.

The frame part 41 has fixing protruded parts 48 (see FIG. 2) formed on its outer peripheral face on the side "−Z" in the "Z"-axis direction. The fixing protruded parts 48 are respectively protruded from centers of a face facing the side "+X" in the "X"-axis direction, a face facing the side "−X" in the "X"-axis direction, a face facing the side "+Y" in the "Y"-axis direction, and a face facing the side "−Y" in the "Y"-axis direction. Each of the fixing protruded parts 48 extends linearly in the "Z"-axis direction and functions as an engagement part with the spring member 70. Further, the stopper 49 is attached to an end part on the side "−Z" in the "Z"-axis direction of the frame part 41.

(Spring Member)

The spring member 70 is disposed on an end part on the side "−Z" in the "Z"-axis direction of the fixed body 20 and connects the movable body 10 to the fixed body 20. The spring member 70 holds a posture of the movable body 10 which is in a stationary state in which the shake correction drive mechanism 50 is not driven. As shown in FIG. 2, the spring member 70 is a plate spring made by forming a metal plate in a rectangular frame shape. The spring member 70 has fixed body-side connecting parts 71 provided on its outer peripheral part, and is connected to the fixed body 20 with the fixed body-side connecting parts 71 fixed to the first member 251 of the second case 250. The spring member 70 also has a frame-shaped movable body-side connecting part 72 provided on its inner peripheral part. The movable body-side connecting part 72 is coupled to the fixed body-side connecting parts 71 via arm parts 73. When the movable body 10 is mounted to the fixed body 20, the fixing protruded parts 48 provided on the outer peripheral face of the movable body 10 engage with recessed parts 75 provided in the movable body-side connecting part 72. The spring member 70 is connected to the movable body 10 by fixing these engaged locations with an adhesive.

(Shake Correction Drive Mechanism)

Figure 4A:
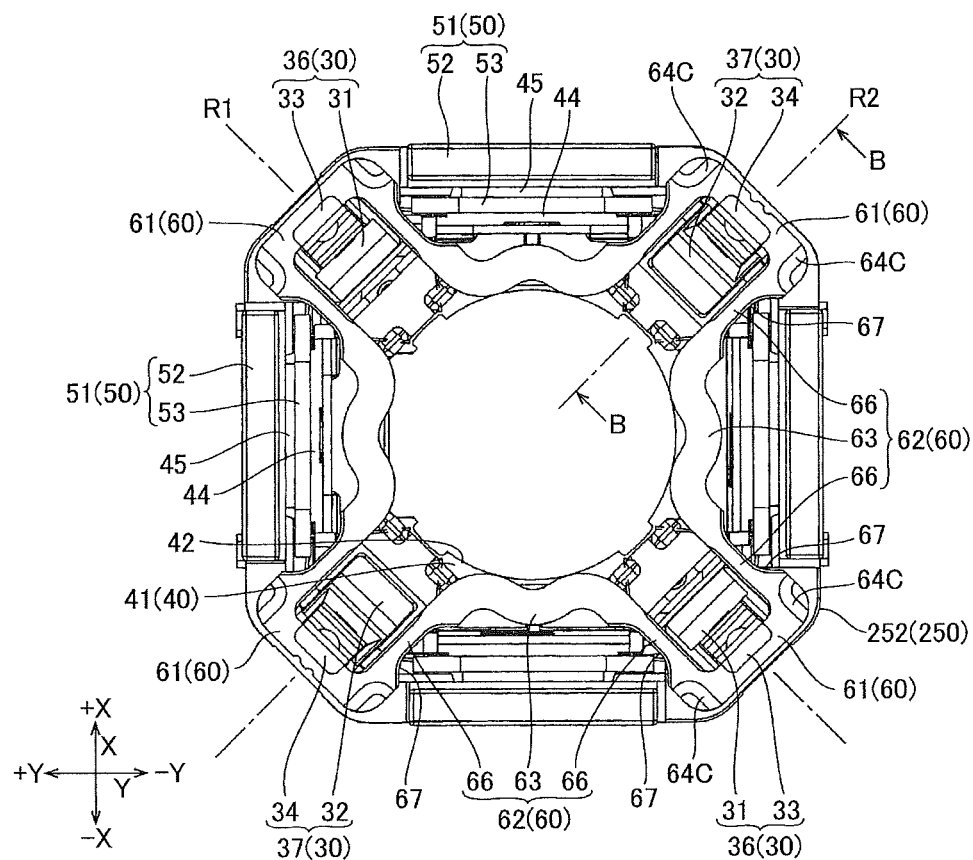
FIG. 4A is a plan view showing an optical unit with a shake correction function from which a first case and an optical module are detached.
Figure 4B:
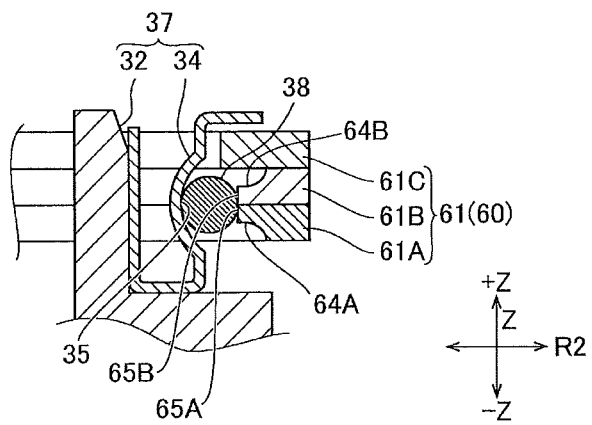
FIG. 4B is a partial cross-sectional view showing a swing support part.

FIG. 4A is a plan view showing the optical unit 1 with a shake correction function from which the first case 210 and the optical module 2 are detached. FIG. 4B is a partial cross-sectional view (taken along line B-B in FIG. 4A) showing one of the second swing support parts 37. The shake correction drive mechanism 50 includes four sets of magnetic-drive mechanisms 51 disposed between the fixed body 20 and the movable body 10. Each of the magnetic-drive mechanisms 51 includes a magnet 52 and a coil 53. The coils 53, each of which is an air-core coil, are held at a side face on the "+X" side in the "X"-axis direction, a side face on the "−X" side in the "X"-axis direction, a side face on the "+Y" side in the "Y"-axis direction, and a side face on the "−Y" side in the "Y"-axis direction of the movable body 10. The magnets 52 are held at inner faces of the side plate parts 216 (see FIG. 2) located on the side "+X" in the "X"-axis direction, the side "−X" in the "X"-axis direction, the side "+Y" in the "Y"-axis direction, and the side "−Y" in the "Y"-axis direction of the body part 211 of the first case 210. Accordingly, the magnets 52 face the coils 53 on all of the side "+X" in the "X"-axis direction, the side "−X" in the "X"-axis direction, the side "+Y" in the "Y"-axis direction, and the side "−Y" in the "Y"-axis direction between the movable body 10 and the body part 211 of the first case 210.

Each of the magnets 52 has an outer face side which is in contact with the body part 211 and an inner face side which fronts on the coil 53. The outer face side and inner face side of each magnet 52 are magnetized in different poles from each other. Further, each of the magnets 52 is divided into two magnet pieces in the optical axis "L" direction (i.e., the "Z"-axis direction), and the faces of the divided inner face sides are magnetized in different poles from each other. Therefore, upper and lower long sides of each of the coils 53 are utilized as effective sides. Magnetizing patterns on the outer face sides and inner face sides of the four magnets 52 are the same as each other. The first case 210 is structured of magnetic material and functions as a yoke for the magnets 52.

As shown in FIG. 4A, the two sets of magnetic-drive mechanisms 51, which are provided with the magnets 52 and coils 53 in pairs and located on the side "+Y" in the "Y"-axis direction and the side "−Y" in the "Y"-axis direction of the movable body 10, are interconnected to generate magnetic-drive forces around the "X" axis in a single direction when electric current is supplied to the two sets of magnetic-drive mechanisms 51. Further, the two sets of magnetic-drive mechanisms 51, which are provided with the magnets 52 and coils 53 in pairs and located on the side "+X" in the "X"-axis direction and the side "−X" in the "X"-axis direction of the movable body 10, are interconnected to generate magnetic-drive forces around the "Y" axis in a single direction when electric current is supplied to the two sets of magnetic-drive mechanisms 51. Accordingly, the movable body 10 is swung around the first axial line "R1" and the second axial line "R2" by a resultant of the magnetic-drive forces generated by supplying electric current to the two sets of magnetic-drive mechanisms 51, which are provided with the magnets 52 and coils 53 in pairs and located on the side "+Y" in the "Y"-axis direction and the side "−Y" in the "Y"-axis direction, and the magnetic-drive forces generated by supplying electric current to the two sets of magnetic-drive mechanisms 51, which are provided with the magnets 52 and coils 53 in pairs and located on the side "+X" in the "X"-axis direction and the side "−X" in the "X"-axis direction. The movable body 10 is thus swung in a direction opposite to a shake around the first axial line "R1" and is also swung in a direction opposite to a shake around the second axial line "R2", so that a shake in a pitching direction and a shake in a yawing direction are corrected.

(Gimbal Mechanism)

The gimbal mechanism 30 is structured between the second case 250 and the holder 40. The gimbal mechanism 30 includes two first swing support parts 36 disposed to be separated from each other in the first axial line "R1" direction when the movable body 10 is mounted to the fixed body 20, two second swing support parts 37 disposed to be separated from each other in the second axial line "R2" direction when the movable body 10 is mounted to the fixed body 20, and a movable frame 60 supported by the first swing support parts 36 and the second swing support parts 37.

Figure 5A:
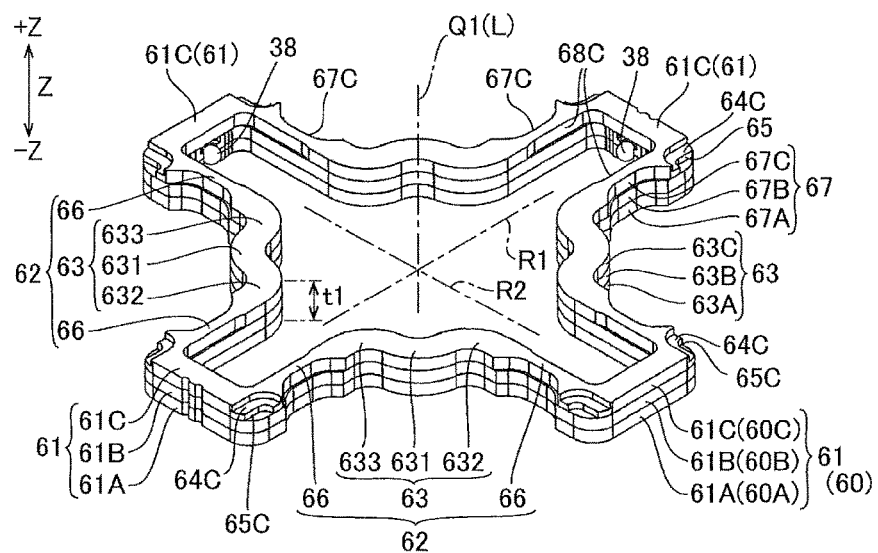
FIGS. 5A and 5B are a perspective view and a perspective cross-sectional view showing a movable frame.
Figure 5B:
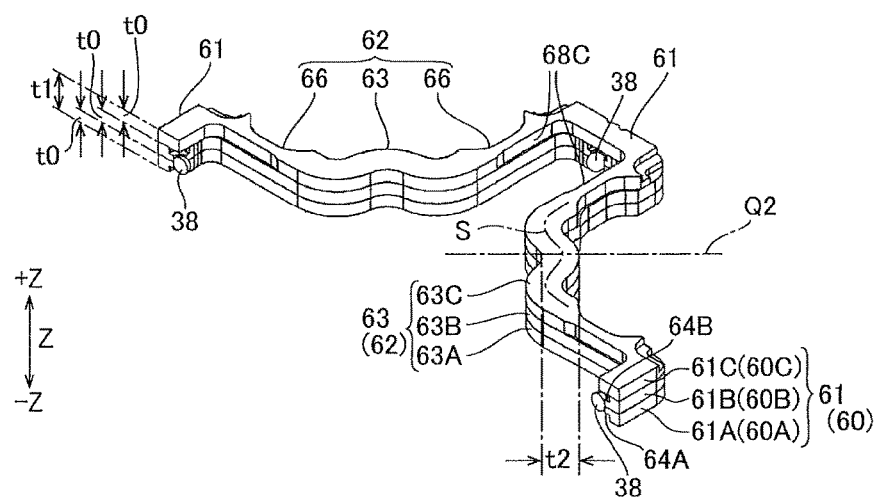

FIG. 5A is a perspective view showing the movable frame 60 and the FIG. 5B is a perspective cross-sectional view showing the movable frame 60. The movable frame 60 is a gimbal spring in a substantially rectangular shape. The movable frame 60 includes four supporting point parts 61 provided around the optical axis L and connecting parts 62 connecting adjacent supporting point parts 61 around the optical axis L to each other. A ball 38 made of metal is fixed by welding or the like to an inner side face of each supporting point part 61. In each supporting point part 61, the ball 38 provides a hemispheric convex face directed toward a center of the movable frame 60. Each of the connecting parts 62 includes a meandering part 63 which extends in the "X"-axis direction or the "Y"-axis direction, and is elastically deformable in a direction perpendicular to the optical axis L.

Each of the first swing support parts 36 includes a first contact spring holding part 31 provided on the second case 250 of the fixed body 20, and a first contact spring 33 held by the first contact spring holding part 31. Each of the first contact springs 33 is a plate spring made of metal and bent in a "U"-shape. The first swing support parts 36 are disposed on inner peripheral sides of the supporting point parts 61 provided diagonally in the first axial line "R1" direction to support the movable frame 60 via the first contact springs 33 attached to be elastically deformable in the first axial line "R1" direction.

Each of the second swing support parts 37 includes a second contact spring holding part 32 provided on the holder 40 of the movable body 10, and a second contact spring 34 held by the second contact spring holding part 32. As shown in FIG. 4B, each of the second contact springs 34 is a plate spring made of metal and bent in a "U"-shape, and is the same in shape as each of the first contact springs 33. The second swing support parts 37 support the movable frame 60 via the second contact springs 34 attached to be elastically deformable in the second axial line "R2" direction.

The first contact springs 33 of the first swing support parts 36 as well as the second contact springs 34 of the second swing support parts 37 include hemispheric contact parts 35 (see FIG. 4B) which are in contact with the balls 38 welded to the supporting point parts 61. The balls 38 joined to the supporting point parts 61 provided at the four locations around the optical axis L are brought into point contact with the hemispheric contact parts 35 of the first contact springs 33 and second contact springs 34, so that the movable frame 60 is supported. Accordingly, the movable frame 60 is supported to be rotatable around each of the two directions (the first axial line "R1" direction, the second axial line "R2" direction) perpendicular to the optical axis "L" direction.

(Movable Frame)

The movable frame 60 is a stacked body of a first plate-shaped spring 60A, a second plate-shaped spring 60B, and a third plate-shaped spring 60C which are stacked on top of each other in the optical axis "L" direction (i.e., the "Z"-axis direction) and are joined together by laser welding. These three plate-shaped springs are the same in thickness as each other, each of which is a frame-shaped plate spring having a thickness direction in the optical axis "L" direction. The first plate-shaped spring 60A and the second plate-shaped spring 60B are joined together at the supporting point parts 61, and the balls 38 are joined to the joints between the first plate-shaped spring 60A and the second plate-shaped spring 60B. Further, the third plate-shaped spring 60C and the second plate-shaped spring 60B are joined together at both sides in a circumferential direction of each supporting point part 61. The first plate-shaped spring 60A, the second plate-shaped spring 60B, and the third plate-shaped spring 60C are formed by etching. Alternatively, these plate-shaped springs may be formed by press working.

Figure 6:
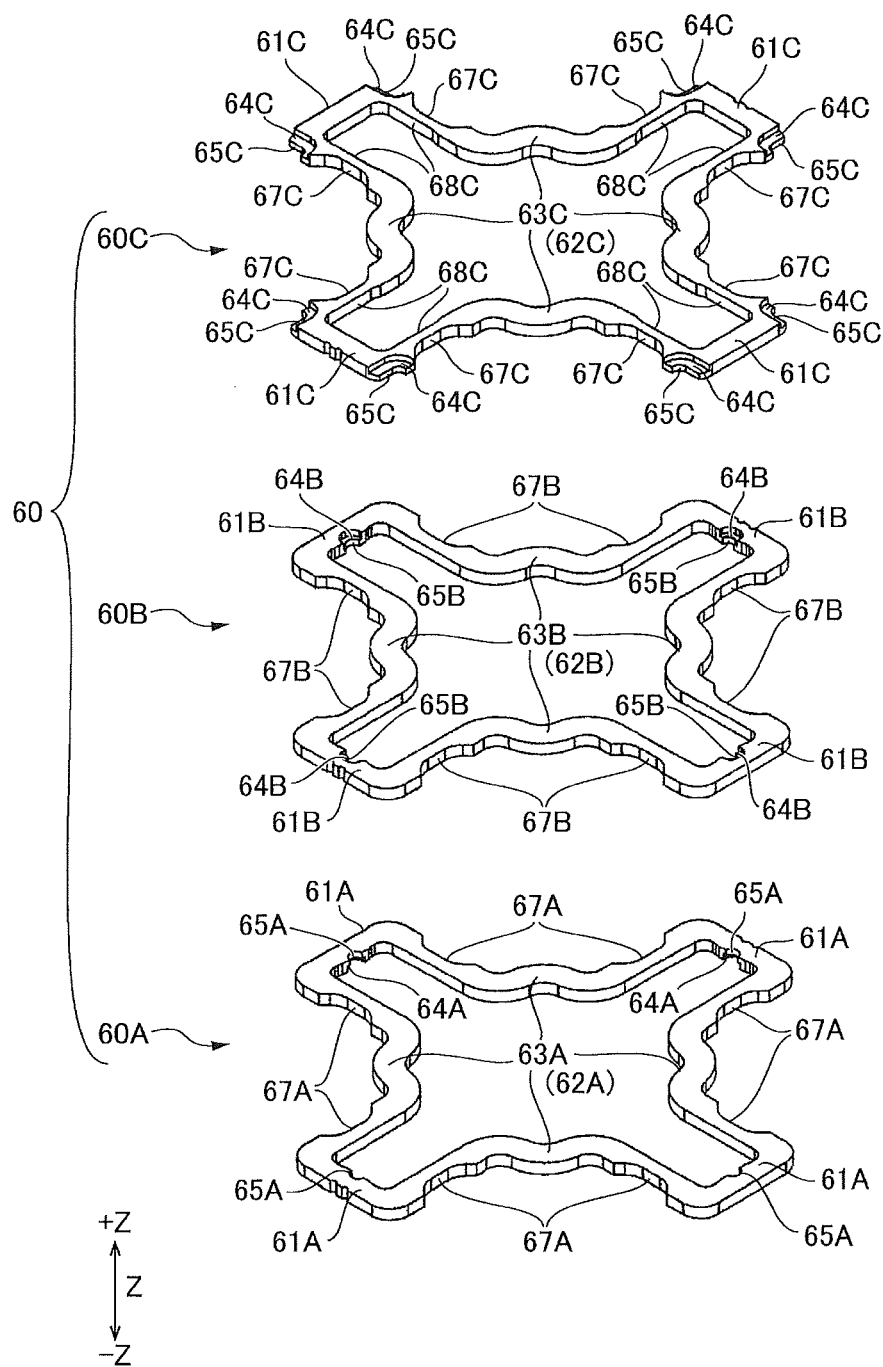
FIG. 6 is an exploded perspective view showing the movable frame.

FIG. 6 is an exploded perspective view showing the movable frame 60. As shown in FIGS. 5A, 5B, and 6, the first plate-shaped spring 60A includes four supporting point parts 61A to which the balls 38 are joined, and connecting parts 62A each of which connects adjacent supporting point parts 61A around the optical axis L to each other and includes a meandering part 63A. Each of the supporting point parts 61A has a semicircular thin-walled part 64A formed at its center in the circumferential direction, and a semicircular cut-out part 65A formed at a center of the thin-walled part 64A. The thin-walled part 64A and the cut-out part 65A are provided on an edge on an inner peripheral side of each supporting point part 61A. Likewise, the second plate-shaped spring 60B includes four supporting point parts 61B to which the balls 38 joined, and connecting parts 62B each of which connects adjacent supporting point parts 61B around the optical axis L to each other and includes a meandering part 63B. Each of the supporting point parts 61B has a semicircular thin-walled part 64B, and a semicircular cut-out part 65B formed at a center of the thin-walled part 64B.

As shown in FIG. 5B, the thin-walled part 64A of each supporting point part 61A is in contact with the thin-walled part 64B of each supporting point part 61B in the "Z"-axis direction (i.e., the optical axis "L" direction). The first plate-shaped spring 60A and the second plate-shaped spring 60B are joined together by joining the four thin-walled parts 64A and the four thin-walled parts 64B together by laser welding. The balls 38 are welded to end faces on inner peripheral sides of the thin-walled parts 64A, 64B concurrently with the joining of the thin-walled parts 64A, 64B by laser welding.

The third plate-shaped spring 60C includes four supporting point parts 61C overlaid on the four supporting point parts 61B of the second plate-shaped spring 60B, and connecting parts 62C each of which connects adjacent supporting point parts 61C around the optical axis L to each other and includes a meandering part 63C. Each of the supporting point parts 61C has thin-walled parts 64C formed on its both sides in the circumferential direction, and cut-out parts 65C formed at centers of the respective thin-walled parts 64C. The thin-walled parts 64C and the cut-out parts 65C are located on outer peripheral edges of corners between the supporting point parts 61C and the connecting parts 62C. The thin-walled parts 64C of the third plate-shaped spring 60C are welded by laser welding to the second plate-shaped spring 60B.

In the movable frame 60 structured of a stacked body of plate-shaped springs, as shown in FIG. 5A, a meandering part 63 is a center of a connecting part 62 between two supporting point parts 61 and 61, and a portion between the meandering part 63 and each of the supporting point parts 61 is a straight part 66 extending in a direction parallel with a radial direction. The meandering part 63 is located on an inner peripheral side relative to the supporting point parts 61. The meandering part 63 includes a first curved part 631 which is protruded to an outer peripheral side, a second curved part 632 which is protruded to an inner peripheral side at one side in a circumferential direction of the first curved part 631, and a third curved part 633 which is protruded to the inner peripheral side at the other side in the circumferential direction of the first curved part 631. The second curved part 632 and the third curved part 633 are connected to the straight parts 66 in a curved shape.

The gimbal mechanism 30 swingably supports the movable body 10 with respect to the fixed body 20. The movable body 10 is swingably supported around the two axial lines, that is, the first axial line R1 which passes through a pair of supporting point parts 61 provided diagonally on the movable frame 60 and the second axial line R2 which is perpendicular to the first axial line R1 and passes through another pair of supporting point parts 61. It is assumed herein that a direction perpendicular to the first axial line R1 and the second axial line R2 is defined as a first direction Q1 (see FIG. 5A) whereas a direction perpendicular to the first direction Q1 and a meandering path S (see FIG. 5B) of the meandering part 63 is defined as a second direction Q2 (see FIG. 5B). On this assumption, the first direction Q1 is a direction perpendicular to a plane containing the movable frame 60. Further, the second direction Q2 is a member width (size) direction of the meandering part 63 when viewed in the first direction Q1. When the movable body 10 is not swung, the first direction Q1 coincides with the optical axis "L" direction, that is, the "Z"-axis direction.

In the movable frame 60, the connecting part 62 has a nonuniform member width (size) when viewed in the first direction Q1 (i.e., the optical axis "L" direction) and the meandering part 63 is formed to be larger in size than the straight part 66. More specifically, the straight part 66 has an outer cut-out part 67 formed on its outer peripheral edge by cutting the straight part 66 toward an inner peripheral side at a certain depth. Therefore, the straight part 66 is smaller in size than the meandering part 63 by an area of the outer cut-out part 67. Making the member width of the meandering part 63 large causes the meandering part 63 to possess appropriate stiffness and suppresses excessive enhancement in spring characteristic. The meandering part 63 has such a shape that the first curved part 631, the second curved part 632, and the third curved part 633 are connected together. These three curved parts are the same in member width (size) as each other when viewed in the first direction Q1.

Each of the meandering part 63A, the meandering part 63B, and the meandering part 63C of the respective plate-shaped springs has a cross-sectional shape in which a thickness t2 (see FIG. 5B) in the second direction Q2 is larger than a thickness t0 (see FIG. 5B) in the first direction Q1 of each plate-shaped spring. With regard to each of the meandering part 63A, the meandering part 63B, and the meandering part 63C, further, the thickness t2 in the second direction Q2 is preferably not less than twice as large as the thickness t0 in the first direction Q1. Since the movable frame 60 is a stacked body of three plate-shaped springs as described above, a thickness t1 in the first direction Q1 of the entire stacked body is larger than the thickness t2 in the second direction Q2. Since the thickness t1 in the first direction Q1 of the entire stacked body is larger than the thickness t2 in the second direction Q2, it is possible to further enhance the stiffness of the meandering part 63. Accordingly, it is possible to further reduce a shift amount of the movable body due to an external impact.

As shown in FIGS. 3 and 4A, when the movable frame 60 is mounted to the first swing support parts 36 and second swing support parts 37, the meandering parts 63 are disposed to pass between the upper module 2A (see FIG. 3) of the optical module 2 and the wall parts 44. Each of the supporting point parts 61 is located at an angular position between wall parts 44 adjacent to each other in the circumferential direction. The supporting point parts 61 are located on an outer peripheral side relative to the wall parts 44 and the coils 53. As described above, the movable frame 60 has a plan shape in which portions where the meandering parts 63 are formed are recessed toward the inner peripheral side. The holder 40 has a space secured for disposing each supporting point part 61 between wall parts 44 adjacent to each other in the circumferential direction. Accordingly, it is possible to dispose the wall parts 44 and the coils 53 on the inner peripheral side and to dispose the magnets 52 facing the coils 53 on the inner peripheral side. It is therefore possible to miniaturize the entire device in the direction perpendicular to the optical axis L.

In order to make the straight part 66 between the meandering part 63 and the supporting point part 61 smaller in size than the meandering part 63 as described above, the movable frame 60 has the outer cut-out part 67 formed on the outer peripheral edge of the straight part 66. Therefore, the space, which is provided on the outer peripheral side of the meandering part 63 for disposing the wall part 44 and the coil 53, is widened by an area corresponding to the outer cut-out part 67. Accordingly, it is possible to increase the length in the "X"-axis direction or "Y"-axis direction of the wall part 44 and to upsize the coil 53. Alternatively, it is possible to miniaturize the entire device instead of the upsizing of the wall part 44 and coil 53.

As shown in FIG. 5A, the outer cut-out part 67 corresponds to a portion where an outer cut-out part 67A of the first plate-shaped spring 60A, an outer cut-out part 67B of the second plate-shaped spring 60B, and an outer cut-out part 67C of the third plate-shaped spring 60C are overlaid. The outer cut-out part 67A is the same in shape as the outer cut-out part 67B whereas the outer cut-out part 67C is larger in area than the outer cut-out parts 67A and 67B. More specifically, the third plate-shaped spring 60C has the outer cut-out part 67C formed by cutting the outer peripheral edge of the straight part 66 toward an inner side relative to the first plate-shaped spring 60A and the second plate-shaped spring 60B. The third plate-shaped spring 60C also has an inner cut-out part 68C formed by cutting an inner peripheral edge of the straight part 66 toward an outer side relative to the first plate-shaped spring 60A and the second plate-shaped spring 60B.

In the movable frame 60, the third plate-shaped spring 60C is provided at the farthest position in the optical axis "L" direction from the ball 38 welded to each supporting point part 61 (i.e., a contact portion with the first swing support part 36 or the second swing support part 37). Therefore, when the movable frame 60 is inclined at the swinging of the movable body 10, a shift amount of the third plate-shaped spring 60C is larger than those of the first plate-shaped spring 60A and second plate-shaped spring 60B. To address this disadvantage, the outer peripheral edge and inner peripheral edge of the third plate-shaped spring 60C which are cut to be larger than those of the first plate-shaped spring 60A and those of the second plate-shaped spring 60B (i.e., the outer cut-out part 67C and the inner cut-out part 78C) decrease a possibility of contact of the movable frame 60 with its neighboring components (e.g., the coils 53, the wall parts 44) if the movable frame 60 is inclined at the swinging of the movable body 10.

(Principal Functional Effects in this Embodiment)

In the optical unit 1 with a shake correction function according to this embodiment, as described above, the movable frame 60 of the gimbal mechanism 30, which is a support mechanism structured to swingably support the movable body 10, includes the meandering parts 63 located on the inner peripheral side relative to the supporting point parts 61 supported by the first swing support parts 36 and the second swing support parts 37. Further, the meandering parts (i.e., the meandering parts 63A, 63B, 63C) of the first plate-shaped spring 60A, second plate-shaped spring 60B, and third plate-shaped spring 60C that structure the movable frame 60 have the cross-sectional shape in which on the assumption that the direction perpendicular to the first axial line R1 and the second axial line R2 is defined as the first direction Q1 and the direction perpendicular to the first direction Q1 and the meandering path S of each meandering part 63 is defined as the second direction Q2, the thickness t2 in the second direction Q2 is larger than the thickness t0 in the first direction Q1 of each plate-shaped spring. Accordingly, it is possible to appropriately enhance the stiffness of each meandering part 63 while allowing each meandering part 63 to have a spring characteristic in a plane direction. It is thus possible to reduce a shift amount of the movable body 10 due to an external impact.

In this embodiment, each meandering part 63 includes the three curved parts which are connected to the straight parts 66 in a curved shape. As described above, it is possible to make the meandering parts 63 large in size irrespective of limitations on a space as the number of curved parts is small.

Further, it is possible to further enhance the spring characteristic as compared with the spring characteristic to be effected by the curved shape and to suppress excessive enhancement in spring characteristic. Accordingly, it is possible to reduce a shift amount of the movable body to which an external impact has been applied.

In this embodiment, the thickness in the second direction Q2 of each meandering part 63 is larger than the thickness in the second direction Q2 of each straight part 66. It is thus possible to secure the stiffness of each meandering part 63 and to reduce a space for disposing each straight part 66. Accordingly, it is possible to reduce a shift amount of the movable body to which an external impact has been applied, and to miniaturize the entire device.

In this embodiment, the movable frame 60 is the stacked body of the plurality of plate-shaped springs (i.e., the first plate-shaped spring 60A, the second plate-shaped spring 60B, the third plate-shaped spring 60C) stacked on top of each other in the first direction Q1, that is, the optical axis "L" direction. Of the plurality of plate-shaped springs, two plate-shaped springs (i.e., the first plate-shaped spring 60A, the second plate-shaped spring 60B) are joined together at the supporting point parts 61 whereas the remaining one plate-shaped spring (i.e., the third plate-shaped spring 60C) is joined to the second plate-shaped spring 60B at both sides in the circumferential direction of each supporting point part 61. In this embodiment, since the first plate-shaped spring 60A, the second plate-shaped spring 60B, and the third plate-shaped spring 60C are produced by etching, the thickness t0 (plate thickness) in the first direction cannot be made large irrespective of the widthwise dimension (size). However, it is possible to achieve a required cross-sectional shape by stacking a plurality of plate-shaped springs.

In this embodiment, the first plate-shaped spring 60A, the second plate-shaped spring 60B, and the third plate-shaped spring 60C are joined together at the supporting point parts 61 and their vicinities. Therefore, these plate-shaped springs are joined together in the vicinities of locations where load is to be applied. Accordingly, it is possible to enhance the stiffness of the movable frame 60. Specifically, the first plate-shaped spring 60A and the second plate-shaped spring 60B are joined together by laser welding at the locations where the thin-walled parts 64A and the thin-walled parts 64B are overlaid. Further, the thin-walled parts 64C of the third plate-shaped spring 60C and the second plate-shaped spring 60B are joined together by laser welding at both sides in the circumferential direction of each supporting point part 61. As described above, it is possible to securely join the plate-shaped springs without high-power welding, by laser-welding the thin-walled parts.

In this embodiment, the outer cut-out parts 67C of the third plate-shaped spring 60C disposed at the furthest location in the optical axis "L" direction from the balls 38 welded to the supporting point parts 61 are larger than the outer cut-out parts 67A, 67B of the other plate-shaped springs. Further, the third plate-shaped spring 60C is provided with the inner cut-out parts 68C. Accordingly, even when the movable frame 60 is inclined at the swinging of the movable body 10 so that the third plate-shaped spring 60C shifts largely relative to the other plate-shaped springs, there is a low possibility of contact of the third plate-shaped spring 60C with its neighboring components (e.g., the coils 53, the wall parts 44).

Modified Embodiments (1) In the embodiment described above, the movable frame 60 is a stacked body of three plate-shaped springs which are stacked on top of each other and joined together, but may be structured of a single plate-shaped spring. In this case, the movable frame 60 is structured of a single plate-shaped spring in which a thickness t2 in a second direction Q2 of a meandering part is larger than a thickness t0 in a first direction Q1. Desirably, the thickness t2 in the second direction Q2 is not less than twice as large as the thickness t0 in the first direction Q1. It is thus possible to enhance stiffness even when a single plate-shaped spring is used. Alternatively, the movable frame 60 may be a stacked body of two plate-shaped springs which are stacked on top of each other and joined together. In each of the two plate-shaped springs, a thickness t2 in a second direction Q2 of a meandering part is not less than twice as large as a thickness t0 in a first direction Q1 of each plate-shaped spring. It is also possible to enhance stiffness by an increase in number of plate-shaped springs. Alternatively, the number of plate-shaped springs may be not less than four. The plate-shaped springs to be stacked may be different in thickness from each other.

(2) In the embodiment described above, each of the meandering parts 63 has a shape which is curved three times. Each of the meandering parts 63 may be changed to a curved part which is curved only once toward an inner peripheral side of a movable frame. In this case, the curved part may be structured to have a cross-sectional shape in which on the assumption that a direction perpendicular to a first direction Q1 and a curved path of the curved part is defined as a second direction Q2, a thickness t2 in the second direction Q2 is larger than a thickness t0 in the first direction Q1 of each plate-shaped spring.

While the description above refers to particular embodiments of the present invention, it will be understood that many modifications may be made without departing from the spirit thereof. The accompanying claims are intended to cover such modifications as would fall within the true scope and spirit of the present invention.

The precisely disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body;
    a fixed body;
    a support mechanism structured to swingably support the movable body around a first axial line and a second axial line intersecting each other; and
    a shake correction drive mechanism structured to swing the movable body,
    wherein
    the support mechanism includes a movable frame and a plurality of swing support parts structured to support the movable frame,
    some of the swing support parts are provided on the fixed body and remaining swing support parts are provided on the movable body,
    the movable frame is structured of a single plate-shaped spring or a stacked body of a plurality of plate-shaped springs stacked on top of each other in a first direction perpendicular to the first axial line and the second axial line,
    each plate-shaped spring includes supporting point parts which are in contact with the swing support parts and connecting parts each of which connects two supporting point parts to each other and includes a meandering part or a curved part located on an inner peripheral side relative to the supporting point part, and
    at each of the meandering parts or curved parts, a thickness in a second direction perpendicular to the first direction and a meandering path of the meandering part or a curved path of the curved part is larger than a thickness in the first direction of each plate-shaped spring.

2. The optical unit with a shake correction function according to claim 1, wherein
    each of the connecting parts includes the meandering part and straight parts which connect the meandering part to the supporting point parts,
    each of the meandering parts includes a first curved part protruded to an outer peripheral side, a second curved part protruded to an inner peripheral side on one side in a circumferential direction of the first curved part, and a third curved part protruded to the inner peripheral side on another side in the circumferential direction of the first curved part, and
    the second curved part and the third curved part are respectively connected to the straight parts in a curved shape.

3. The optical unit with a shake correction function according to claim 2, wherein
    a thickness in the second direction of each meandering part is larger than a thickness in the second direction of each straight part.

4. The optical unit with a shake correction function according to claim 3, wherein
    the movable frame is structured of the stacked body in which some or all of the plate-shaped springs are joined together at the supporting point parts.

5. The optical unit with a shake correction function according to claim 4, wherein
    at each of the plate-shaped springs, the thickness in the second direction of each meandering part is not less than twice as large as the thickness in the first direction of each meandering part.

6. The optical unit with a shake correction function according to claim 4, wherein
    the plurality of plate-shaped springs includes a first plate-shaped spring, a second plate-shaped spring, and a third plate-shaped spring which are stacked on top of each other in the first direction,
    the first plate-shaped spring and the second plate-shaped spring are joined together at the supporting point parts, and
    the third plate-shaped spring and the second plate-shaped spring are joined together at both sides in the circumferential direction of each supporting point part.

7. The optical unit with a shake correction function according to claim 6, wherein
    the third plate-shaped spring includes a thin-walled part to be joined to the second plate-shaped spring.

8. The optical unit with a shake correction function according to claim 7, wherein
    the third plate-shaped spring includes outer cut-out parts formed by cutting outer peripheral edges of the connecting parts toward an inner side relative to the first plate-shaped spring and the second plate-shaped spring.

9. The optical unit with a shake correction function according to claim 8, wherein
    the third plate-shaped spring includes inner cut-out parts formed by cutting inner peripheral edges of the connecting parts toward an outer side relative to the first plate-shaped spring and the second plate-shaped spring.

10. The optical unit with a shake correction function according to claim 9, wherein
the movable body includes an optical module and a plurality of wall parts located on an outer peripheral side of the optical module,
the wall parts are provided to be separated from each other in the circumferential direction, and a coil of the shake correction drive mechanism is fixed to each wall part, and
the meandering parts or curved parts of the movable frame are located on inner peripheral sides of the wall parts, and each of the supporting point parts of the movable frame is disposed between adjacent wall parts in the circumferential direction.

11. The optical unit with a shake correction function according to claim 6, wherein
the third plate-shaped spring includes outer cut-out parts formed by cutting outer peripheral edges of the connecting parts toward an inner side relative to the first plate-shaped spring and the second plate-shaped spring.

12. The optical unit with a shake correction function according to claim 6, wherein
the third plate-shaped spring includes inner cut-out parts formed by cutting inner peripheral edges of the connecting parts toward an outer side relative to the first plate-shaped spring and the second plate-shaped spring.

13. The optical unit with a shake correction function according to claim 1, wherein
the movable body includes an optical module and a plurality of wall parts located on an outer peripheral side of the optical module,
the wall parts are provided to be separated from each other in a circumferential direction, and a coil of the shake correction drive mechanism is fixed to each wall part, and
the meandering parts or curved parts of the movable frame are located on inner peripheral sides of the wall parts, and each of the supporting point parts of the movable frame is disposed between adjacent wall parts in the circumferential direction.

14. The optical unit with a shake correction function according to claim 4, wherein
the movable body includes an optical module and a plurality of wall parts located on an outer peripheral side of the optical module,
the wall parts are provided to be separated from each other in the circumferential direction, and a coil of the shake correction drive mechanism is fixed to each wall part, and
the meandering parts or curved parts of the movable frame are located on inner peripheral sides of the wall parts, and each of the supporting point parts of the movable frame is disposed between adjacent wall parts in the circumferential direction.

* * * * *